(12) United States Patent
Choi et al.

(10) Patent No.: US 10,899,656 B2
(45) Date of Patent: Jan. 26, 2021

(54) GLASS COMPOSITION, PREPARATION METHOD OF GLASS COMPOSITION, AND COOKING APPLIANCE

(71) Applicant: LG ELECTRONICS INC., Seoul (KR)

(72) Inventors: Wongyu Choi, Seoul (KR); Youngseok Kim, Seoul (KR); Suyeon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 95 days.

(21) Appl. No.: 15/885,490

(22) Filed: Jan. 31, 2018

(65) Prior Publication Data

US 2018/0215654 A1 Aug. 2, 2018

(30) Foreign Application Priority Data

Feb. 2, 2017 (KR) .................. 10-2017-0014833

(51) Int. Cl.
| | |
|---|---|
| *C03C 8/08* | (2006.01) |
| *C03B 1/00* | (2006.01) |
| *F24C 15/00* | (2006.01) |
| *C03B 27/02* | (2006.01) |
| *C03C 3/064* | (2006.01) |
| *C03C 4/20* | (2006.01) |

(52) U.S. Cl.
CPC .................. *C03C 8/08* (2013.01); *C03B 1/00* (2013.01); *C03B 27/028* (2013.01); *C03C 3/064* (2013.01); *C03C 4/20* (2013.01); *F24C 15/005* (2013.01); *C03C 2207/00* (2013.01); *C03C 2207/02* (2013.01); *C03C 2207/04* (2013.01)

(58) Field of Classification Search
CPC .. C03C 8/08; C03C 3/064; C03C 4/20; C03C 2207/02; C03C 2207/00; C03C 2207/04; C03B 27/028; C03B 1/00; F24C 15/005
See application file for complete search history.

(56) References Cited

U.S. PATENT DOCUMENTS

| 7,695,831 B2 * | 4/2010 | Shon ......................... C03C 8/08 |
| | | 428/432 |
| 9,296,642 B2 | 3/2016 | Lee et al. |
| 2005/0032621 A1 * | 2/2005 | Zou ......................... C03C 3/062 |
| | | 501/46 |
| 2008/0305939 A1 * | 12/2008 | Oogaki ....................... C03C 3/21 |
| | | 501/46 |

(Continued)

FOREIGN PATENT DOCUMENTS

| KR | 10-0398541 B1 | 8/1996 |
| KR | 10-2013-0125918 A | 11/2013 |

(Continued)

*Primary Examiner* — Noah S Wiese
(74) *Attorney, Agent, or Firm* — Dentons US LLP

(57) ABSTRACT

A glass composition formed of glass frit including $P_2O_5$, $TiO_2$ and group I-based oxide, wherein $P_2O_5$ is contained in an amount of 20 wt % to 30 wt % based on a total weight of the glass frit, wherein $TiO_2$ is contained in an amount of 10 wt % to 20 wt % based on the total weight of the glass frit, and wherein the group I-based oxide is contained in an amount of 15 wt % to 30 wt % based on the total weight of the glass frit.

6 Claims, 2 Drawing Sheets

(56) References Cited

U.S. PATENT DOCUMENTS

| | | | | |
|---|---|---|---|---|
| 2009/0311514 | A1* | 12/2009 | Shon | C03C 8/08 |
| | | | | 428/325 |
| 2013/0299482 | A1* | 11/2013 | Kim | C03C 4/20 |
| | | | | 219/391 |
| 2013/0299484 | A1* | 11/2013 | Lee | C03C 3/062 |
| | | | | 219/391 |
| 2015/0368151 | A1* | 12/2015 | Kuwatani | C03C 3/21 |
| | | | | 501/46 |

FOREIGN PATENT DOCUMENTS

| | | | |
|---|---|---|---|
| KR | 1020130125910 | A | 11/2013 |
| KR | 1020140115562 | A | 10/2014 |
| SU | 631478 | A | 11/1978 |

\* cited by examiner

GLASS COMPOSITION, PREPARATION METHOD OF GLASS COMPOSITION, AND COOKING APPLIANCE

CROSS-REFERENCE TO RELATED APPLICATION

This application claims the benefit of Korean patent application No. 10-2017-0014833, filed on Feb. 2, 2017, the entire content of which is incorporated herein by reference.

BACKGROUND

Field of the Present Disclosure

The present disclosure relates to a glass composition, a method of manufacturing the composition, and a cooking appliance including the composition.

Discussion of Related Art

Enamel refers to a glass glaze coated on a surface of a metal plate. Enamel is typically used for cooking appliances, such as microwave ovens and ovens. Enamel may be classified as an oxidation-resistant enamel which can prevent oxidation, or a heat-resistant enamel which can withstand high temperature, depending on the kind or use of glaze. Depending on the material added into the enamel, enamel may be classified into aluminum enamel, zirconium enamel, titanium enamel, and soda glass enamel.

In general, a cooking appliance refers to a device that heats and cooks food using a heating source. The food waste generated in the cooking process contacts the inner wall of the cavity portion of the cooking appliance. Therefore, when the food is cooked in the cooking appliance, it is necessary to clean the inside of the cavity portion. In addition, because cooking generally involves high temperature, the inner wall of the cavity portion may be exposed to the organic substance and the alkali ingredient. Therefore, when enamel is used therein, such enamel requires heat resistance, chemical resistance, abrasion resistance, and contamination resistance. Therefore, there is a need for a composition for enamel for improving the heat resistance, chemical resistance, abrasion resistance, and contamination resistance of enamel.

Particularly, in order to easily clean the enamel used in the oven, a pyrolysis method of burning contaminants at high temperature, a method of using a strong alkaline detergent, or a water soaking may be used. Accordingly, because the enamel is exposed to a high-temperature or high-alkali detergent, the enamel requires high heat resistance and chemical resistance.

SUMMARY

The present invention has been made in order to solve the above at least the above problems associated with the conventional technology.

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

Embodiments of the present invention provide a glass appliance with improved cleanability and white color, and a cooking appliance including the composition.

Embodiments of the present invention provide a glass composition comprising glass frit including $P_2O_5$, $TiO_2$ and group I-based oxide, wherein $P_2O_5$ is contained in an amount of 20 wt % to 30 wt % based on a total weight of the glass frit, wherein $TiO_2$ is contained in an amount of 10 wt % to 20 wt % based on the total weight of the glass frit, wherein the group I-based oxide is contained in an amount of 15 wt % to 30 wt % based on the total weight of the glass frit.

According to embodiments of the present disclosure, the glass composition may have improved cleanability. Accordingly, the cooking appliance may be cleaned with only water-soaking.

That is, although the inner face of the door and the inner face of the cavity portion may be contaminated by food and organic substances generated during the cooking process while the heating space (also referred to as a cooking space) defined in the cavity portion of the cooking appliance is closed, the inner face of the door and the inner face of the cavity portion may be easily cleaned with only the water-soaking.

Further, the glass composition according to an embodiment of the invention may realize a white functional layer using only a single type of glass frit. Accordingly, the step of mixing different types of glass frit to realize the white color may be omitted, and, thus, improve efficiency.

Further, because the functional layer coated by the glass composition according to an embodiment of the invention has excellent cleanability, the inner surface of the cooking appliance can be easily cleaned.

Further, contaminants including oil, such as chicken oil, and sugars can be more easily and quickly removed, from the functional layer coated by the glass composition according to an embodiment of the invention.

Further, because the functional layer may be directly coated on the inner faces of the cavity portion and the door without a separate buffer layer therebetween, production process efficiency can be improved and a thickness of the cavity portion and door due to the coating of the functional layer can be minimized.

Further, because the glass composition according to an embodiment of the invention has a softening point greater than a predetermined temperature and a proper thermal expansion coefficient, the composition can withstand cooking and cleaning at a high temperature for a relatively long time.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTIONS

Figure 1:
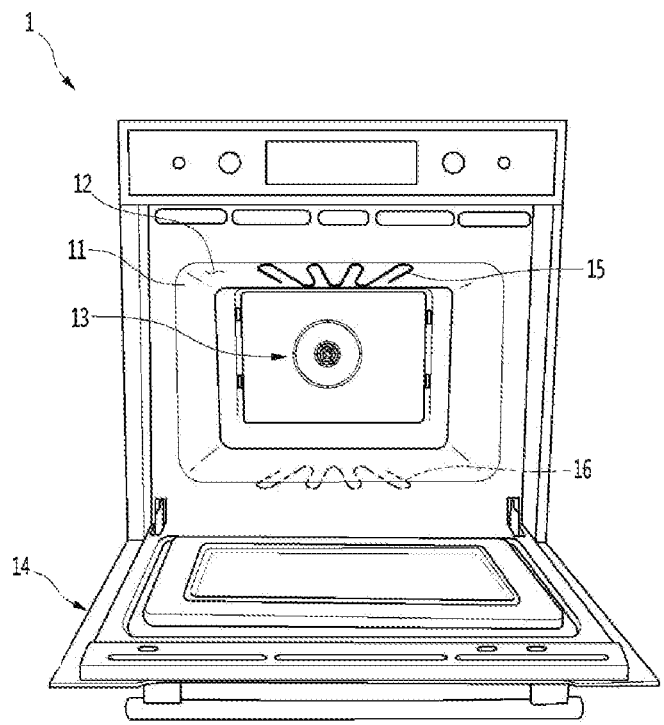
FIG. 1 is a front view of a cooking appliance according to an embodiment of the invention.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

Hereinafter, a glass composition according to an embodiment of the present invention and a cooking appliance including the same will be described with reference to the drawings.

Of the terms described below, the term "adherence" is generally understood to refer to the pre-firing coatability of the glass composition, and the term "adhesion" is generally understood to refer to a post-firing coatability thereof.

FIG. 1 is a front view of a cooking appliance according to an embodiment of the invention. Referring to FIG. 1, a cooking device or appliance 1 may include a cavity portion 11 having a heating space 12 defined therein; a door 14 configured to selectively open and close the heating space 12; and at least one heat source configured to supply heat for heating food to be cooked within the heating space 12.

The cavity portion 11 may be formed in a hexahedral shape (not limited thereto) with the front face opened. The heat source may include the following components: a convection assembly 13 for discharging heated air into the cavity in the cavity portion 11, an upper heater 15 disposed on the upper inner face of the cavity portion 11, and a lower heater 16 disposed on a lower inner face of the cavity portion 11. It is understood that the heat source does not need to include all of the convection assembly 13, the upper heater 15 and the lower heater 16, and may include other components. For example, the heat source may include at least one of the convection assembly 13, the upper heater 15, and the lower heater 16. The upper heater 15 and/or the lower heater 16 may be provided inside or outside the cavity of the cavity portion 11.

Referring to FIGS. 2-5, a functional layer may be disposed on the inner face of the cavity portion 11 and/or on the inner face of the door 14. The functional layer may comprise a glass composition as described in more detail below. The functional layer may be coated or disposed on the inner face of the cavity portion 11 and/or the inner face of the door 14. That is, the functional layer may be a coating layer. The functional layer can improve the heat resistance, chemical resistance, and stain resistance of the inner face of the cavity portion 11 and the inner face of the door 14.

Figure 2:
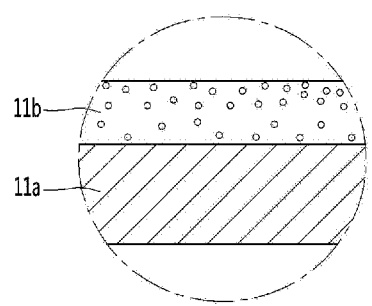
FIG. 2 is an enlarged cross-sectional view of a portion of the inner face of the cavity portion of FIG. 1.
Figure 3:
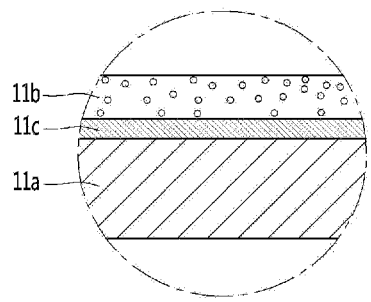
FIG. 3 is an enlarged cross-sectional view of a portion of the inner face of the cavity portion of FIG. 1.

Referring to FIGS. 2 and 3, the functional layer may be coated or disposed on surfaces that form the cavity portion. The cavity portion 11 may include a metal layer 11a, and a functional layer 11b on the metal layer 11a. The metal layer 11a may form the base of the cavity portion.

Referring to FIG. 2, the functional layer 11b may be disposed in direct contact with the metal layer 11a.

Alternatively, referring to FIG. 3, the functional layer 11b may be in indirect contact with the metal layer 11a. In such arrangement, for example, a buffer layer 11c may be disposed between the metal layer 11a and the functional layer 11b. The buffer layer 11c may comprise an adhesive layer. Thus, the adhesion between the metal layer 11a and the functional layer 11b can be improved as a result of the buffer layer 11c.

Figure 4:
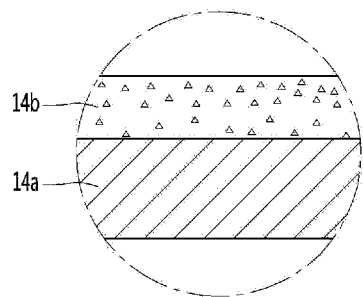
FIG. 4 is an enlarged view of a portion of the inner face of the door of FIG. 1.
Figure 5:
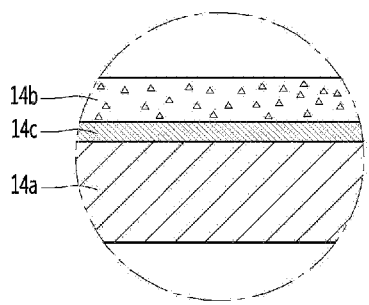
FIG. 5 is an enlarged view of a portion of the inner face of the door of FIG. 1.

Referring to FIGS. 4 and 5, the functional layer may be disposed on the inner face of the door 14. For example, the functional layer may be disposed on the inner face of the door 14 facing the heating space 12 with the heating space 12 being closed. The functional layer can improve the heat resistance, chemical resistance and stain resistance of the inner face of the door 14.

The door 14 may include a metal layer 14a, and a functional layer 14b on the metal layer 14a. The metal layer 14a may form the base of the cavity portion.

Referring to FIG. 4, the functional layer 14b may be disposed in direct contact with the metal layer 14a.

Alternatively, referring to FIG. 5, the functional layer 14b may be disposed in indirect contact with the metal layer 14a. In detail, a buffer layer 14c may be disposed between the metal layer 14a and the functional layer 14b. The buffer layer 14c may comprise an adhesive layer. That is, the adhesion between the metal layer 14a and the functional layer 14b can be improved by the buffer layer 14c.

The functional layer may be formed by coating or applying the glass composition on the inner face of the cavity portion 11 or on the inner face of the door 14. For example, the functional layer may be coated on the inner face of the cavity portion 12 and on the inner face of the door 14 so that the inner face of the cavity portion 12 and the inner face of the door 14 have improved heat resistance, chemical resistance, and stain resistance.

Hereinafter, the glass composition coated on the inner faces of the cavity portion and door of the cooking appliance will be described.

The glass composition may be an enamel composition.

The glass composition according to an embodiment of the invention may include glass frit including $P_2O_5$, $TiO_2$, and group I-based oxide.

The $P_2O_5$ may be contained at up to about 30 wt % based on the total weight of the glass frit. Specifically, the $P_2O_5$ may be present in an amount of about 20 wt % to about 30 wt % based on the total weight of the glass frit. More specifically, the $P_2O_5$ may be present in an amount from about 22 wt % to about 28 wt % based on the total weight of the glass frit.

The $P_2O_5$ may be included in the glass composition to improve cleanability of the glass composition. Further, the $P_2O_5$ may be included in the glass composition to improve the hydrophilicity of the glass composition.

Figure 6:
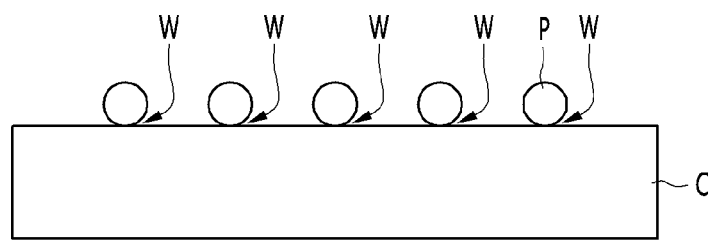
FIG. 6 is a view illustrating that contaminants are removed from the coating layer.

Accordingly, as shown in FIG. 6, because of the presence of $P_2O_5$, the coating layer C containing the glass composition is hydrophilic. Thus, after water-soaking, water W can effectively penetrate the interface between the coating layer C and the contaminants P on the coating layer C, and the contaminants can be more easily removed from the coating layer C.

If $P_2O_5$ is included at less than about 20 wt % based on the total weight of the glass frit, the cleanability of the glass composition may be degraded. Further, if $P_2O_5$ is included in an amount of more than about 30 wt % based on the total weight of the glass frit, the thermal properties of the glass composition may be degraded, the vitrification of the glass composition and adherence of the glass composition may be degraded.

$TiO_2$ may be contained at less than about 20 wt % based on the total weight of the glass frit. Specifically, $TiO_2$ may be present at about 10 wt % to about 20 wt %, based on the total weight of the glass frit. More specifically, $TiO_2$ may be present in an amount of about 12 wt % to about 18 wt % based on the total weight of the glass frit.

$TiO_2$ can improve the opacity of the glass composition according to an embodiment of the invention. That is, the opacity of the coating composition of the glass composition coated as the functional layer can be improved by $TiO_2$. In other words, the functional layer formed by the glass composition including $TiO_2$ may exhibit white color.

When $TiO_2$ is contained at less than about 10 wt % based on the total weight of the glass frit, the opacity of the glass composition may be lowered such that the color of the buffer layer or the color of the base may be viewed from the outside.

That is, when $TiO_2$ is contained at less than about 10 wt % based on the total weight of the glass frit, it is difficult to realize the white color of the functional layer formed by the glass composition. Thus, when placing the functional layer on the base or buffer layer, the color of the base or buffer layer may be visible from outside, in addition to the color of the functional layer.

Further, if TiO2 is contained in an amount greater than about 20 wt % based on the total weight of the glass frit, cleanability of the glass composition may be degraded. This may lead to deviation from the vitrification area. This may weaken the vitrification and durability of the glass composition.

The group I-based oxide includes at least one metal oxide selected from a group consisting of $Li_2O$, $Na_2O$ and $K_2O$. Specifically, the group I-based oxide may include $Na_2O$, $K_2O$ and $Li_2O$. That, the glass frit may contain all of $Na_2O$, $K_2O$ and $Li_2O$.

The group I-based oxide may be contained up to about 30 wt % based on the total weight of the glass frit. Specifically, the group I-based oxide may be contained at from about 15 wt % to about 30 wt % based on the total weight of the glass frit. More specifically, the group I-based oxide may be contained at from about 20 wt % to about 25 wt % based on the total weight of the glass frit.

The group I-based oxide may be included in the glass composition to improve the cleanability and durability of the glass composition and reduce the melting temperature.

That is, the group I-based oxide can improve the cleanability of the glass composition together with the $P_2O_5$. For example, $Na_2O$ and $K_2O$ may be incorporated in the glass composition to improve the cleanability of the glass composition. Further, Li2O may be incorporated in the glass composition to improve the durability of the glass composition.

If the group I-based oxide is contained at less than about 15 wt % based on the total weight of the glass frit, the cleanability and durability of the glass composition may be degraded. Further, when the group I-based oxide is contained in an amount exceeding about 30 wt % based on the total weight of the glass frit, the thermal properties of the glass composition may be deteriorated and the vitrification may not be achieved.

For example, if the glass frit contains all of $Na_2O$, $K_2O$ and $Li_2O$, $Na_2O$, $K_2O$ and $Li_2O$ may be included as follows.

$Na_2O$ may be present in an amount of about 5 wt % to about 10 wt % based on the total weight of the glass frit. Specifically, the $Na_2O$ may be present in an amount of about 6 wt % to about 9 wt % based on the total weight of the glass frit.

$K_2O$ may be present at about 10 wt % to about 20 wt % based on the total weight of the glass frit. Specifically, $K_2O$ may be present at about 12 wt % to about 18 wt % based on the total weight of the glass frit.

If contents of $Na_2O$ and the $K_2O$ are out of the range specified above, the cleanability of the glass composition may be degraded.

$Li_2O$ may be present in an amount of about 0.1 wt % to about 1.5 wt % based on the total weight of the glass frit. Specifically, $Li_2O$ may be present in an amount of about 0.5 wt % to about 1 wt % based on the total weight of the glass frit.

If content of $Li_2O$ is out of the range specified above, the durability is degraded and vitrification may not be achieved.

$P_2O_5$, $Na_2O$, $K_2O$, and $Li_2O$ may form an alkali phosphate glass structure. Further, $P_2O_5$, $Na_2O$, $K_2O$, and $Li_2O$ may impart improved cleanability and durability to glass compositions according to the embodiments.

That is, since the glass frit contains $P_2O_5$, $Na_2O$, $K_2O$, and $Li_2O$, the functional layer can be easily cleaned by water when the functional layer formed by the glass composition according to the embodiment is contaminated by food or the like.

The glass frit may further comprise $SiO_2$.

$SiO_2$ may be present at up to about 20 wt % based on the total weight of the glass frit. Specifically, $SiO_2$ may be present in an amount of from about 10 wt % to about 20 wt % based on the total weight of the glass frit. More specifically, $SiO_2$ may be present in an amount from about 12 wt % to about 28 wt % based on the total weight of the glass frit.

$SiO_2$ may be incorporated in the glass composition to form a glass structure of the glass composition, to improve the skeleton of the glass structure, and to improve the acid resistance of the glass frit. In particular, due to $SiO_2$, the glass composition may have improved acid resistance. Further, $SiO_2$ is contained in the glass composition to improve the water resistance. In other words, $SiO_2$ is contained in the glass composition, to prevent the functional layer formed of the glass composition from absorbing water.

If $SiO_2$ content is less than about 10 wt % based on the total weight of the glass frit, the glass structure of the glass composition may be degraded, resulting in a reduction in durability, acid resistance, and water resistance of the functional layer. Further, if $SiO_2$ is contained in an amount exceeding about 20 wt % based on the total weight of the glass frit, the cleanability of the glass frit may be lowered.

The glass frit may further comprise $B_2O_3$.

$B_2O_3$ may be present at up to about 15 wt % based on the total weight of the glass frit. Specifically, $B_2O_3$ may be present in an amount of about 5 wt % to about 15 wt % based on the total weight of the glass frit. More specifically, $B_2O_3$ may be contained at from about 7 wt % to about 13 wt %, based on the total weight of the glass frit.

$B_2O_3$ can enlarge the vitrification region of the glass frit and appropriately control the thermal expansion coefficient of the glass composition according to the embodiment. Further, $B_2O_3$ is contained in the glass composition, allowing each component contained in the glass composition to be dissolved uniformly prior to firing.

When $B_2O_3$ is contained at less than about 5 wt % based on the total weight of the glass frit, the vitrification area is reduced and thus the glass structure is degraded, thereby reducing the durability of the functional layer. Further, if $B_2O_3$ content is greater than about 15 wt % based on the total weight of the glass frit, the cleanability of the glass frit may be degraded.

The glass frit may further comprise $Al_2O_3$.

$Al_2O_3$ may be present at up to about 30 wt % based on the total weight of the glass frit. Specifically, $Al_2O_3$ may be present in an amount of about 10 wt % to about 30 wt % based on the total weight of the glass frit. More specifically, $Al_2O_3$ may be present in an amount from about 15 wt % to about 25 wt % based on the total weight of the glass frit.

$Al_2O_3$ may be incorporated in the glass composition to improve the chemical durability of the glass composition and improve the heat resistance and surface hardness.

If the $Al_2O_3$ is contained at less than about 10 wt % based on the total weight of the glass frit, the chemical resistance and durability of the glass composition may be reduced. Further, when $Al_2O_3$ is contained in an amount of more than about 30 wt % based on the total weight of the glass frit, the cleanability of the glass frit may be lowered, adhesion may be lowered due to an increase in firing temperature and melting temperature, and production process efficiency may be reduced.

The glass frit may further comprise $ZrO_2$.

$ZrO_2$ may be present at up to about 5 wt % based on the total weight of the glass frit. Specifically, $ZrO_2$ may be present at about 1 wt % to about 5 wt %, based on the total weight of the glass frit. More specifically, $ZrO_2$ may be present in an amount from about 2 wt % to about 4 wt % based on the total weight of the glass frit.

$ZrO_2$ may be incorporated into the glass composition to improve the chemical durability of the glass composition.

If $ZrO_2$ is contained at less than about 1 wt % based on the total weight of the glass frit, the chemical resistance and durability of the glass composition can be reduced. Further, when $ZrO_2$ is contained in an amount of more than about 5 wt % based on the total weight of the glass frit, the cleanability of the glass frit may be lowered, the vitrification may not be achieved, and the adhesion may be degraded due to increase in the melting temperature thereof.

That is, $Al_2O_3$ and $ZrO_2$ may improve the chemical durability of the glass frit. In particular, $Al_2O_3$ and $ZrO_2$ may improve the chemical durability of the alkali phosphate glass structure formed by $P_2O_5$, $Na_2O$, $K_2O$ and $LiO_2$ via structural stabilization.

The glass frit may further contain fluorinated compounds. The fluorinated compound may be selected from NaF or $AlF_3$. Specifically, the fluorinated compound may include NaF and $AlF_3$. That is, the glass frit may contain all of NaF and $AlF_3$.

The fluorinated compound may function to properly control the surface tension of the coating formed by the glass composition. Further, the fluorinated compound may allow the vitrification area of the glass frit to be enlarged, and allow the melting temperature of the glass composition to be lowered.

The fluorinated compound may be contained at up to about 5 wt % based on the total weight of the glass frit. Specifically, the fluorinated compound may be contained at from about 0.1 wt % to about 5 wt %, based on the total weight of the glass frit. More specifically, the fluorinated compound may be present in an amount of about 1 wt % to about 4 wt % based on the total weight of the glass frit.

When the fluorinated compound is contained at less than about 0.1 wt % based on the total weight of the glass frit, the vitrification area is reduced and thus the glass structure is degraded, thereby decreasing the durability of the functional layer. Further, if the fluorinated compound is contained in an amount greater than about 5 wt % based on the total weight of the glass frit, the cleanability of the glass frit may be degraded.

The glass frit may further contain the group II-based oxide. The group II-based oxide may be selected from CaO, BaO, or MgO. Specifically, the group II-based oxide may include CaO, BaO and MgO. That is, the glass frit may include CaO, BaO and MgO.

The group II-based oxide may be contained in an amount of up to about 10 wt % based on the total weight of the glass frit. Specifically, the group II-based oxide may be contained in an amount of about 0.1 wt % to about 10 wt % based on the total weight of the glass frit. More specifically, the group II-based oxide may be present in an amount of about 3 wt % to about 7 wt % based on the total weight of the glass frit.

The group II-based oxide can improve the durability of the glass composition.

If the group II-based oxide is contained at less than about 0.1 wt % based on the total weight of the glass frit, the chemical composition, surface tension and durability of the glass composition may be reduced. Further, if the group II-based oxide is contained in an amount exceeding about 10 wt % based on the total weight of the glass frit, the cleanability of the glass frit may be lowered.

The diameter of the glass frit may be about 1 to 50 μm. Further, the glass frit may be dispersed in a solvent such as acetone or water. That is, the glass composition according to the embodiment may be used in a dispersion form in which the glass frits are dispersed in the solvent. Further, the glass composition according to an embodiment may further include an organic binder. That is, the enamel composition according to the embodiment may be used in the form of a paste.

The glass frit according to the embodiment may form a glass composition by the following method. Specifically, the glass frit may be used alone or in combination with other types of glass frit to form the glass composition.

That is, a single type of glass frit according to the embodiment may be used alone to form a glass composition. This glass composition may be applied as a functional layer for a cooking appliance. In this connection, the functional layer formed of the single type of glass frit according to the embodiment may exhibit white color.

Alternatively, the embodiments are not limited thereto. The glass frit according to the embodiment may be mixed with glass frit having different compositions and/or composition ratios from those of the glass frit according to the embodiment. These mixed glass frits may be used to form a glass composition. The glass frits with the different compositions and/or composition ratios may exhibit a color other than white, for example, blue. For example, the mixing ratio between the glass frit according to the embodiment and the glass frit of the other type may be about 90:10 to 99:1.

The glass composition may be applied as a functional layer for a cooking appliance. In this case, the functional layer formed by the glass frit according to the embodiment may exhibit white.

In a non-limiting example, the glass composition according to the embodiment may be prepared by the following method.

First, a glass frit material to form the glass frit may be prepared. The glass frit material may include $P_2O_5$, $TiO_2$, and group I-based oxide. The group I-based oxide includes at least one metal oxide selected from a group consisting of $Li_2O$, $Na_2O$ and $K_2O$.

The glass frit material may further include at least one of $SiO_2$, $B_2O_3$, $Al_2O_3$ and $ZrO_2$. The glass frit material may further include at least one of CaO, MgO, and BaO. The glass frit material may further include at least one of NaF and $AlF_3$.

After the glass frit material is prepared, the glass frit material may then be melted. For example, the glass frit material may be melted for about 30 minutes to about 2 hours at a temperature of about 1100° C. to about 1500° C.

The melted glass frit material may then be quenched using a chiller or water. Accordingly, the glass frit may be formed. In this connection, depending on the content of each component contained in the glass frit material, the content of each component of the formed glass frit may be determined. That is, the content of each component contained in the glass frit material may be substantially the same as the content of each component of the glass frit.

The glass frits may then be dispersed in a solvent, such as acetone. The solvent may then be dried. Once dry, the glass frits may then be filtered by a mesh structure or the like. In particular, the glass frits may be filtered to have a diameter of about 50 μm or less.

In this way, an enamel composition including the glass frit may be formed.

Then, in a non-limiting example, the enamel composition according to the embodiment may form the functional layer by the following method.

Once a glass composition according to an embodiment of the invention may be used in a dispersion in which the glass frits are dispersed in a solvent, such as water. That is, the glass frits may be dispersed in a solvent. The glass composition according to the embodiment may then be coated on a face of an object to be coated by a spraying process or other like application. The object of interest may be a metal plate or a reinforced glass plate. For example, the object of interest may be an entirety or a portion of the cooking device.

Alternatively, the glass composition according to the embodiment may be coated on the object in a dried state. For example, depending on the embodiments, the glass composition may be coated on the object by electrostatic attraction.

Thereafter, the object coated with the enamel composition according to the embodiment may be fired for about 100 seconds to about 600 seconds at a temperature of about 700° C. to about 900° C.

In this way, the glass composition according to an embodiment forms a coating layer on the object, and thus the functional layer including the glass composition may be formed on the object.

The glass composition according to an embodiment may have a glass deformation temperature TD of about 500° C. or higher by appropriately adjusting the composition of the glass frit material, thereby realizing high heat resistance. Accordingly, the glass composition according to the embodiment may be more efficiently applied to the cooking appliance or the like.

Hereinafter, the present disclosure will be described in more detail based on glass composition manufacturing methods according to embodiments of the invention and comparison examples. The embodiments are merely an example to illustrate the present disclosure in more detail and are non-limiting.

Exemplar Present Embodiment 1

The following is an exemplar embodiment of the invention, identified as exemplar present embodiment 1.

The glass frit material was provided as in Table 1 below.

At this time, $NH_4H_2PO_4$ was used as the starting material for $P_2O_5$; $Na_2CO_3$, $K_2CO_3$, $Li_2CO_3$ were used as starting materials for $Na_2O$, $K_2O$, $Li_2O$ respectively; $BaCO_3$, $CaCO_3$ were used as starting materials for BaO and CaO, respectively; remaining components were the same as those shown in Table 1.

Then, after mixing the glass frit materials, the mixture was melted at a temperature of about 1400° C. for about 1 hour to about 2 hours and subsequently quenched in a quenching roller to obtain glass cullet.

Subsequently, about 0.1 wt % to about 1 wt % of organic polysiloxane was added to the glass cullet, followed by milling and grinding in a ball mill for about 4 hours to about 6 hours. The crushed cullet passes through a 325 mesh sieve or screen. As a result, the glass frits were formed to have a particle diameter of about 44 μm or less.

Then, the glass frits were sprayed onto a low carbon steel sheet having a size of 200×200 mm and a thickness of 1 mm or less using a corona discharge gun. In this connection, the voltage of the corona discharge gun was controlled to 40 kV to 100 kV.

The amount of glass frits sprayed on the low carbon steel sheet was 300 g/m².

Then, the low carbon steel having the glass frits sprayed thereon was fired at a temperature of 830° C. to 870° C. for 300 seconds to 450 seconds to form a functional layer on a face of the low carbon steel.

In this connection, the functional layer was formed to a thickness of about 80 μm to 250 μm.

Exemplar Present Embodiment 2

The following is another exemplar embodiment of the invention, identified as exemplar present embodiment 2.

The functional layer was formed in the same manner as the embodiment 1 except glass frit materials were provided as shown in Table 1 below.

Exemplar Present Embodiment 3

The following is an exemplar embodiment of the invention, identified as exemplar present embodiment 3.

The functional layer was formed in the same manner as the embodiment 1 except glass frit materials were provided as shown in Table 1 below.

Comparison Example 1

The following is a comparison example, identified as comparison example 1.

The functional layer was formed in the same manner as the embodiment 1 except glass frit materials were provided as shown in Table 1 below.

Comparison Example 2

The following is another comparison example, identified as comparison example 2.

The functional layer was formed in the same manner as the embodiment 1 except glass frit materials were provided as shown in Table 1 below.

The Applicant then proceeded to characterize the functional layers fabricated by the embodiments and comparison examples.

The softening points Td and the thermal expansion coefficients of the functional layers were measured, and the cleanability of each functional layer were measured by the cleanability test.

To measure the thermal properties of the glass, the pellet specimen was fired under the same conditions as those of the glass composition. After polishing both surfaces of the specimen in parallel with each other, the Td (softening point) and CTE (thermal expansion coefficient) were measured using a TMA (Thermo Mechanical Analyzer) at a temperature increase rate of 10° C./min.

The cleanability was measured by applying a 1 g of chicken oil as a contaminant on the surface of the enamel-coated test body 200×200 mm using a brush. Thereafter, the test body to which the contaminant was applied was placed in a thermostat, and the contaminants were fixed to the body at a temperature of about 250 degree C. and for 1 hour.

After the fixation, the test body was caused to cool naturally, and then the degree of curing thereof was confirmed. Then, the test body was immersed in a water bath at 70° C. for 10 seconds to 10 minutes. Thereafter, the cured chicken oil and a cheery pie filling as sugar ingredients were wiped out with a wet cloth at a force of 3 kgf or less. A 5 cm-diameter bottom-flatted rod was used to homogenize the wiped area in the contaminated enamel surface. At this time, the number of wiping reciprocations as shown in Table 2 was measured and defined as the cleaning frequency. The evaluation indexes thereof were as shown in Table 3 and Table 4 below.

The functional layers produced by the glass frit according to exemplar embodiments 1, 2, and 3, and the comparison examples 1 and 2 exhibit colors, as indicated in Table 5 below:

TABLE 2

| wiping frequency | performance Level |
| --- | --- |
| equal to or smaller than 5 | 5 |
| equal to or smaller than 15 | 4 |
| equal to or smaller than 25 | 3 |
| equal to or smaller than 50 | 2 |
| larger than 50 | 1 |

TABLE 1

| composition wt % | embodiment 1 | embodiment 2 | embodiment 3 | comparison example 1 | comparison example 2 |
| --- | --- | --- | --- | --- | --- |
| $P_2O_5$ | 24.6 | 24.1 | 24.6 | 18.2 | 17.0 |
| $SiO_2$ | 17.1 | 10.0 | 12.5 | 20.7 | 22.7 |
| $B_2O_3$ | 11.6 | 12.1 | 12.6 | 11.3 | 12.5 |
| $Na_2O$ | 6.1 | 6.1 | 6.1 | 5.3 | 5.3 |
| $K_2O$ | 10.1 | 11.3 | 11.3 | 10.7 | 10.7 |
| $Li_2O$ | 1.0 | 0.8 | 0.8 | 0.8 | — |
| $Al_2O_3$ | 10.0 | 18.3 | 10.0 | 16.4 | 18.4 |
| $ZrO_2$ | 2.4 | 2.4 | 2.0 | 2.3 | 2.3 |
| $TiO_2$ | 13.5 | 11.3 | 16.1 | 12.8 | 8.8 |
| CaO | 2 | — | — | — | — |
| MgO | — | 2 | — | — | — |
| BaO | — | — | 2 | — | — |
| NaF | 1.6 | — | 1 | 1.5 | 2.3 |
| $AlF_3$ | — | 1.6 | 1 | — | — |

TABLE 3

| | embodiment 1 | embodiment 2 | embodiment 3 | comparison example 1 | comparison example 2 |
|---|---|---|---|---|---|
| softening point ° C. | 509 | 480 | 490 | 470.2 | 465.1 |
| thermal expansion coefficient × $10^{-7}$/° C. | 113 | 119 | 118 | 121.1 | 124.3 |

TABLE 4

| | embodiment 1 | embodiment 2 | embodiment 3 | comparison example 1 | comparison example 2 |
|---|---|---|---|---|---|
| cleanability | 5 | 5 | 5 | 2 | 1 |

TABLE 5

| | embodiment 1 | embodiment 2 | embodiment 3 | comparison example 1 | comparison example 2 |
|---|---|---|---|---|---|
| color | white | white | white | blue | blue |

Referring to Table 3, it may be seen that the functional layers produced by the glass frits according to the exemplar embodiments 1, 2, and 3 have a high softening point and thermal expansion coefficient. That is, the functional layers produced by the glass frits of the exemplar embodiments 1, 2, and 3 have a softening point of about 500° C. or higher and a thermal expansion coefficient of about 100 ($10^{-7}$/° C.) or more.

That is, it may be seen that the functional layers formed by the glass frits according to the exemplar embodiments 1, 2 and 3 have improved durability and chemical resistance.

Further, referring to Table 4, it may be seen that the functional layers formed by the glass frits according to the exemplar embodiments 1, 2, and 3 have improved cleanability compared to the functional layers formed by the glass frits according to the comparison examples 1 and 2.

Further, referring to Table 5, it may be seen that the functional layers produced by the glass frit according to the exemplar embodiments 1, 2, and 3 exhibit white. That is, while the functional layer produced by glass frits according to comparison examples exhibit blue, each of the glass frits according to the exemplar embodiments 1, 2, and 3 may implement a white functional layer even if used alone.

According to the embodiments of the present disclosure, the glass composition may have improved cleanability. Accordingly, the cleaning of the cooking appliance may be improved. In detail, the cooking appliance can be cleaned only with water-soaking.

That is, although the inner face of the door and the inner face of the cavity portion are contaminated or coated by food and organic substances generated during the cooking process while the heating space defined in the cavity portion of the cooking appliance is closed, the inner face of the door and the inner face of the cavity portion may be easily cleaned only with the water-soaking.

Further, the glass composition according to the embodiments of the present disclosure may realize a white functional layer using only a single type of glass frit. Accordingly, it is possible to omit the step of mixing different types of glass frit to realize the white color, and, thus, the process efficiency can be improved.

Further, since the functional layer coated by the glass composition according to the embodiments of the present disclosure is excellent in cleanability, the inner surface of the cooking appliance can be easily cleaned even with a small energy.

Further, contaminants including oil, such as chicken oil, and sugars can be effectively removed with less energy and less time, from the functional layer coated by the glass composition according to the embodiments of the present disclosure.

Further, since the functional layer may be directly coated on the inner faces of the cavity portion and the door without a separate buffer layer therebetween, this can improve production process efficiency and minimize the increase in thickness of the cavity portion and door due to the coating of the functional layer.

Further, since the glass composition according to the embodiments of the present disclosure has a softening point higher than a certain temperature and a proper thermal expansion coefficient, the composition can withstand cooking and cleaning at a high temperature for a long time.

While several embodiments have been described above, the present disclosure is not intended to limit the embodiments. Those skilled in the art will recognize that various changes and modifications may be possible without departing from the essential characteristics of the present invention. For example, each component specifically illustrated in the embodiment may be modified. It is also to be understood that the various modifications and variations are intended to be included within the scope of the present disclosure as defined in the appended claims.

What is claimed is:

1. A glass composition comprising glass frit including $P_2O_5$, $TiO_2$, $SiO_2$, $B_2O_3$, $Al_2O_3$, fluorinated compound, $ZrO_2$, group I-based oxide and group II-based oxide, wherein $P_2O_5$ is contained in an amount of 24.1 wt % to 24.6 wt % based on a total weight of the glass frit, wherein $TiO_2$ is contained in an amount of 11.3 wt % to 16.1 wt % based on the total weight of the glass frit, wherein the group I-based oxide is contained in an amount of 17.1 wt % to 18.2 wt % based on the total weight of the glass frit, wherein $SiO_2$ is contained in an amount of 10 wt % to 17.1 wt % based on the total weight of the glass frit, wherein $B_2O_3$ is contained in an amount of 11.6 wt % to 12.6 wt % based on the total weight of the glass frit, wherein $Al_2O_3$ is contained in an amount of 10 wt % to 18.3 wt % based on the total weight of the glass frit, wherein the fluorinated compound is contained in an amount of 1.6 wt % to 2.0 wt % based on the total weight of the glass frit, wherein $ZrO_2$ is contained in an amount of 2.0 wt % to 2.4 wt % based on the total weight of the glass frit, wherein the group I-based oxide comprises at least one metal oxide selected from a group consisting of $Li_2O$, $Na_2O$ and $K_2O$, wherein the group II-based oxide is contained in an amount of 0.1 wt % to 10 wt % based on the total weight of the glass frit, wherein the fluorinated compound includes at least one metal fluoride selected from NaF and $AlF_3$, wherein the glass frit includes a group II-based oxide, wherein the group II-based oxide includes at least one oxide selected from a group consisting of CaO, MgO and BaO, wherein an amount of the I-based oxide is greater than an amount of the $B_2O_3$.

2. A method for producing a glass composition, the method comprising:

preparing glass frit material including $P_2O_5$, $TiO_2$, $SiO_2$, $B_2O_3$, $Al_2O_3$, fluorinated compound, $ZrO_2$, group I-based oxide and group II-based oxide;

melting the glass frit material; and quenching the melted glass frit material, wherein $P_2O_5$ is contained in an amount of 24.1 wt % to 24.6 wt % based on a total weight of the glass frit, wherein $TiO_2$ is contained in an amount of 11.3 wt % to 16.1 wt % based on the total weight of the glass frit, and wherein the group I-based oxide is contained in an amount of 17.1 wt % to 18.2 wt % based on the total weight of the glass frit, wherein $SiO_2$ is contained in an amount of 10 wt % to 17.1 wt % based on the total weight of the glass frit, wherein $B_2O_3$ is contained in an amount of 11.6 wt % to 12.6 wt % based on the total weight of the glass frit, wherein $Al_2O_3$ is contained in an amount of 10 wt % to 18.3 wt % based on the total weight of the glass frit, wherein the fluorinated compound is contained in an amount of 1.6 wt % to 2.0 wt % based on the total weight of the glass frit, wherein $ZrO_2$ is contained in an amount of 2.0 wt % to 2.4 wt % based on the total weight of the glass frit, wherein the group I-based oxide comprises at least one metal oxide selected from a group consisting of $Li_2O$, $Na_2O$ and $K_2O$, wherein the group II-based oxide is contained in an amount of 0.1 wt % to 10 wt % based on the total weight of the glass frit, wherein the fluorinated compound includes at least one metal fluoride selected from NaF and $AlF_3$, wherein the glass frit includes a group II-based oxide, wherein the group II-based oxide includes at least one oxide selected from a group consisting of CaO, MgO and BaO.

3. A cooking device comprising:

a cavity portion having a heating space defined therein;

a door to provide access to the heating space; and at least one heat source to supply heat inside the heating space, wherein at least one of the cavity portion and the door comprises a metal base and a functional layer disposed on the metal base, wherein the functional layer comprises a glass composition, wherein the glass composition comprises glass frit including $P_2O_5$, $TiO_2$, $SiO_2$, $B_2O_3$, $Al_2O_3$, fluorinated compound, $ZrO_2$, group I-based oxide and group II-based oxide, wherein $P_2O_5$ is contained in an amount of 24.1 wt % to 24.6 wt % based on a total weight of the glass frit, wherein $TiO_2$ is contained in an amount of 11.3 wt % to 16.1 wt % based on the total weight of the glass frit, and wherein the group I-based oxide is contained in an amount of 17.1 wt % to 18.2 wt % based on the total weight of the glass frit, wherein $SiO_2$ is contained in an amount of 10 wt % to 17.1 wt % based on the total weight of the glass frit, wherein $B_2O_3$ is contained in an amount of 11.6 wt % to 12.6 wt % based on the total weight of the glass frit, wherein $Al_2O_3$ is contained in an amount of 10 wt % to 18.3 wt % based on the total weight of the glass frit, wherein the fluorinated compound is contained in an amount of 1.6 wt % to 2.0 wt % based on the total weight of the glass frit, wherein $ZrO_2$ is contained in an amount of 2.0 wt % to 2.4 wt % based on the total weight of the glass frit, wherein the group I-based oxide comprises at least one metal oxide selected from a group consisting of $Li_2O$, $Na_2O$ and $K_2O$, wherein the group II-based oxide is contained in an amount of 0.1 wt % to 10 wt % based on the total weight of the glass frit, wherein the fluorinated compound includes at least one metal fluoride selected from NaF and $AlF_3$, wherein the glass frit includes a group II-based oxide, wherein the group II-based oxide includes at least one oxide selected from a group consisting of CaO, MgO and BaO, wherein the functional layer has a softening point of 480° C. to 509° C., and a thermal expansion coefficient of 113 ($10^{-7}$/° C.) to 119 ($10^{-7}$/° C.).

4. The device of claim 3, wherein the glass composition comprises a single type of glass frit.

5. The device of claim 3, wherein the glass composition is formed using at least two different types of glass frit having different compositions and different composition ratios.

6. The device of claim 3, wherein the functional layer is a white color.

* * * * *